April 22, 1941.  W. A. RAY  2,239,116

FLUID PRESSURE REGULATOR

Filed Jan. 11, 1939  2 Sheets—Sheet 1

William A. Ray
INVENTOR,

BY  John H. Rouse.
ATTORNEY

April 22, 1941.                W. A. RAY                2,239,116
                        FLUID PRESSURE REGULATOR
                    Filed Jan. 11, 1939        2 Sheets-Sheet 2

William A. Ray
INVENTOR

BY *John H. Roose*

ATTORNEY

Patented Apr. 22, 1941

2,239,116

UNITED STATES PATENT OFFICE 2,239,116

FLUID PRESSURE REGULATOR

William A. Ray, Glendale, Calif.

Application January 11, 1939, Serial No. 250,401

1 Claim. (Cl. 50—23)

My present invention relates to improvements in fluid pressure regulators and particularly in that type of regulator which is commonly employed to control the pressure of the fuel supplied to gas consuming devices.

A chief object of my invention is the provision of a gas pressure regulator which is inexpensive to manufacture.

A further object of my invention is the provision of a gas pressure regulator, the main component parts of which are fabricated of sheet metal.

A further object is the provision of a regulator which is efficient in maintaining a substantially constant outlet pressure independent of the inlet pressure of the gas line and which includes aspirating means actuated by the gas passing through the outlet of the regulator whereby change in outlet pressure caused by variation in the rate of flow of gas through the regulator is minimized.

Other objects and advantages of my invention will be found in the description, the drawings and the appended claim.

For complete understanding of my invention, reference may be had to the following detailed description and accompanying drawings in which.

Figure 2:
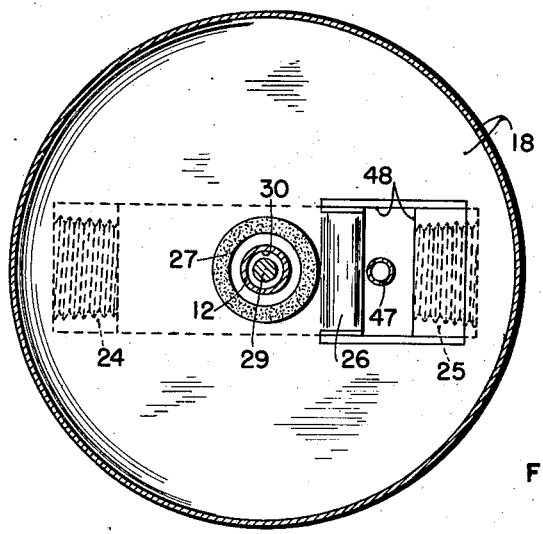
Figure 2 is a section taken on the line 2—2 of Fig. 1.
Figure 1:
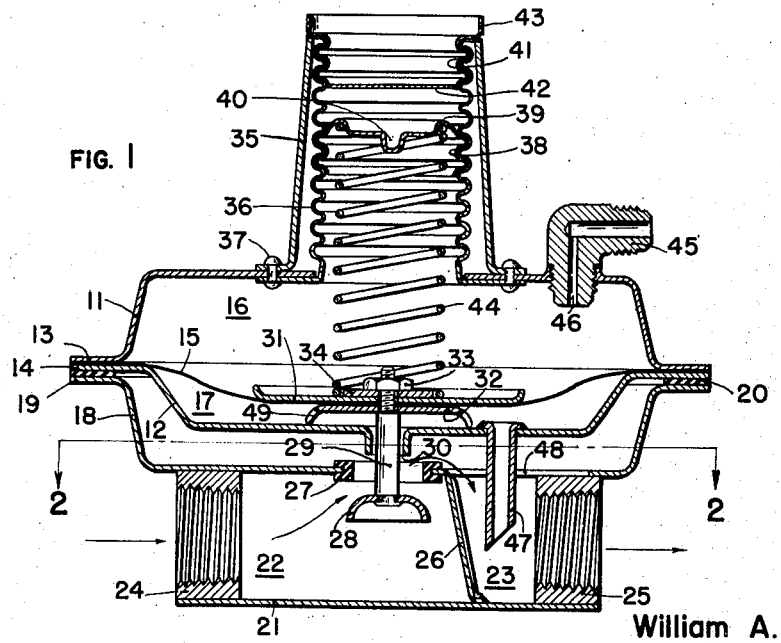
Figure 1 is a sectional view of a regulator embodying my invention.
Figure 3:
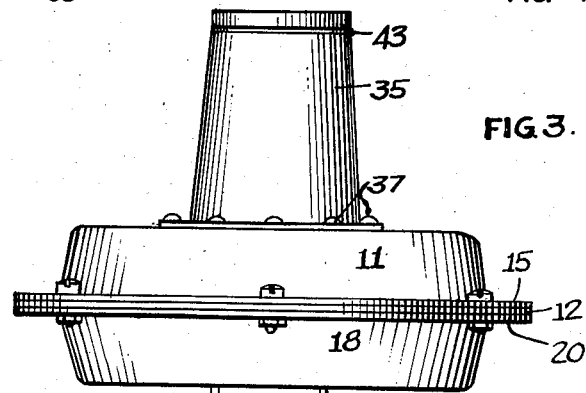
Figure 3 is an end elevation of the regulator shown in Fig. 1.

Referring first to Figs. 1–3 of the drawings, the numeral 11 denotes an upper, upwardly dished, sheet metal member, and the numeral 12 denotes a somewhat similar, but downwardly dished, lower sheet metal member. The members 11 and 12 are provided with horizontal peripheral flange portions 13 and 14 respectively by means of which the said members are secured together with the margin of a flexible diaphragm 15 therebetween which with the said members defines an upper compartment 16 and a lower compartment 17.

A third sheet metal member 18, downwardly dished and having a horizontal peripheral flange portion 19, is secured thereby to the underside of the flange of the lower member 12 with a sealing gasket 20 therebetween.

A sheet metal duct 21, of U-shaped cross-section and having an inlet 22 and an outlet 23, is secured at its open edges to the underside of the bottom wall of member 18 and is provided with hollow rectangular members 24 and 25 which are internally threaded for connecting the regulator in a gas conduit.

The bottom wall of member 18 is slit to provide a tongue 26 which is bent downwardly into contact with the bottom and side walls of the duct 21 to form a partition separating the inlet and the outlet of said duct.

In manufacturing the regulator of my invention, the member 18 is assembled on the duct 21 with the tongue 26 and the threaded members 24 and 25 in position and the respective parts sealingly secured together by oven brazing. Or, if preferred, the parts may be resistance-welded together.

Surrounding a cylindrical opening formed in the bottom wall of member 18 is a grommet-shaped valve seat member 27 of resilient material such as synthetic rubber. Cooperable with the underside of said valve seat member to control fluid flow through the duct 21 is a valve member 28 secured, as by riveting, to the lower end portion of a valve stem 29.

The upper portion of the valve stem extends through a passageway 30 formed in the bottom wall of member 12, the passageway being large enough to provide clearance around the stem through which gas can pass into compartment 17.

The reduced upper end portion of valve stem 29 is threaded and extends through a concentric opening formed in the diaphragm 15 and through upper and lower cup-shaped washers 31 and 32 arranged on opposite sides thereof and is held in that position by a nut 33 and washer 34.

In assembling the regulator, the valve member 29 is passed from above through the opening in member 18 before the seat member 27 is positioned therein.

An upstanding tubular extension 35 having a lower horizontally flanged end portion is provided on the top wall of member 11 surrounding an opening formed therein and supports a metallic screw shell 36 which is secured at its upper end to said extension as by brazing and at its lower flanged end to the member 11. Rivets 37 serve to secure both the extension 35 and the shell 36 to the member 11.

Threadedly received in the screw shell 36 is a second screw shell 38 having an upper end wall 39 provided with a recess 40 for the reception of a screwdriver blade. A third screw shell 41 having a lower end wall 42, and provided with an outwardly flanged upper end portion 43, serves as means for sealing the upper end of the screw shell 36.

A spring 44, compressed between the upper wall of the tension regulating shell 38 and the washer 31, biases the diaphragm assembly downward and, therethrough, the valve member 28 to open position. The tension of the spring may be varied by adjustment of screw shell 38.

Vent means for the upper compartment 16 is provided by a fitting 45 having a restricted passageway 46.

A tubular member 47, brazed in an opening in the bottom wall of member 12, extends through an opening 48, formed in the bottom wall of member 18 by the depression of the tongue 26, into the regulator outlet 23 and serves as aspirating means, actuated by gas flow through said outlet, for lowering the pressure of the gas in the lower compartment 17.

In the operation of the regulator, gas from the line flows through the inlet 22, the valve port, the opening 48 and the outlet 23 to the gas consuming device.

Inlet pressure, applied to the compartment 17 below the diaphragm through the restricted passageway 30 and notches 49 provided in the periphery of washer 32, tends to move the valve member 28 upward against the bias of spring 44 to partially close the valve. The higher the inlet pressure the greater is the force tending to close the valve, and vice versa, and consequently the diaphragm is balanced at a pressure, governed mainly by the adjusted tension of the spring 44 and the clearance around the valve stem in the passageway 30, to control the valve, whereby the outlet pressure is determined.

With increase of gas flow through the regulator, the aspirating means 47 tends to maintain the pressure in the compartment 17 lower than that existing in the outlet 23, by reason of the exhausting action of the fluid flowing past the lower end of the tube 47, and thus the effect of the inlet pressure applied below the diaphragm is reduced with increased flow. The outlet pressure thus remains substantially constant with variation in the rate of flow.

Figure 4:
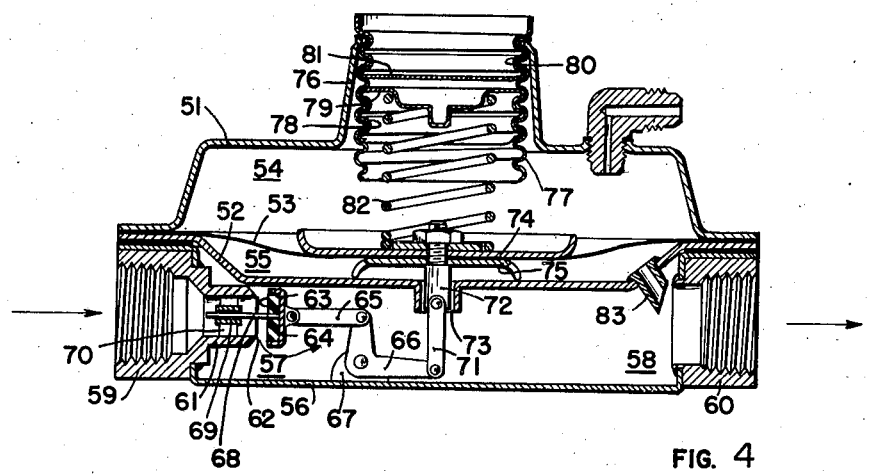
Figure 4 is a sectional view of a modified form of regulator embodying my invention.
Figure 5:
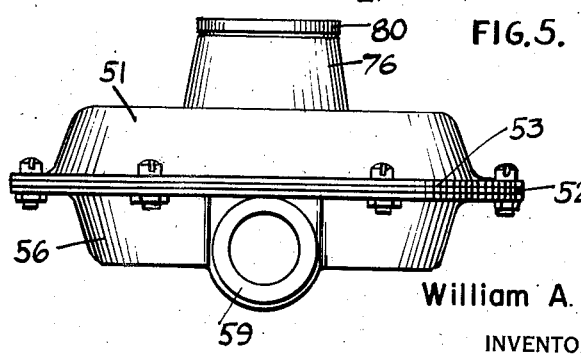
Figure 5 is an end elevation of the regulator shown in Fig. 4.

Referring now to the modified regulator shown in Figs. 4 and 5, the numeral 51 denotes an upper dished sheet metal member and the numeral 52 a lower, somewhat similar, dished sheet metal member, which members are secured together with the margin of a flexible diaphragm 53 therebetween to provide an upper and a lower compartment 54 and 55 respectively.

Secured to the underside of the lower member 52 is a body or duct member 56 having an inlet 57 and an outlet 58 provided with fittings 59 and 60 for connecting the regulator in a gas line. The fitting 59 is provided with an extension 61 constituting a valve port member having a valve seat 62 formed thereon. Cooperable with said valve seat to control gas flow through the regulator is a valve member 63 supported in a cup 64 which is pivotally connected by a link 65 to the upper end portion of a bell-crank lever 66, which is pivotally mounted in a bracket 67 brazed or resistance-welded to the bottom wall of said duct. A rod 68, secured to the cup 64 and sliding in a relatively fixed tubular support 69 which is spaced from the wall of the port by fins 70, serves as guide means for the valve member.

The lower end portion of the bell-crank lever is pivotally connected by a link 71 to a stem 72 which extends upwardly through a guide passageway 73 formed in the bottom wall of member 52, which passageway is made large enough to permit gas to pass freely around the stem 72 into the compartment 55. The upper portion of stem 72 is secured to the diaphragm 53 with cup washers 74 and 75 on opposite sides thereof.

The top wall of member 51 has an upstanding tubular extension 76 formed therein which supports at its upper end a screw shell 77. Threadedly received in said screw shell is a second screw shell 78 having an upper wall 79. A third screw shell 80, having a lower wall 81, serves as a cap for sealing the upper end of shell 77.

Compressed between the wall 79 of shell 78 and washer 74 is a spring 82 which biases the diaphragm downward and, therethrough, the valve to closed position.

Aspirating means, connecting the compartment 55 with the regulator outlet 58, comprises a tubular member 83.

The operation of the modified regulator shown in Figs. 4 and 5 will, it is believed, be obvious from the foregoing description of the operation of the regulator shown in Figs. 1–3, the operation of both forms being substantially identical. In the embodiment shown in Figs. 4 and 5, however, impingement upon the diaphragm of the gas flowing from the inlet of the regulator through the clearance around the stem 72 is less than in the embodiment first described by reason of the positioning of the respective valves.

While I have herein shown and described preferred embodiments of my present invention, it is obvious that modifications may be made therein without departing from the spirit of my invention, which invention is to be limited therefore only by the scope of the appended claim.

I claim as my invention:

A fluid pressure regulator comprising an upper and a lower dished sheet metal member each provided with a peripheral horizontal flange by means of which said members are secured together to provide a chamber, a flexible diaphragm dividing said chamber into an upper and a lower compartment and secured at its margin between said flanges, a third sheet metal member downwardly dished and provided with a peripheral horizontal flange and secured thereby to the underside of the flange of said lower member, said third member being provided with a horizontal passageway having an inlet and an outlet, means in said inlet and said outlet for connecting the regulator in a fluid conduit, valve means for controlling fluid flow through said passageway, means operatively connecting said valve means with said diaphragm and extending freely through an opening formed in the bottom wall of said lower member, aspirating means connecting the interior of said lower compartment with said outlet, and means in said upper compartment biasing said diaphragm downward and therethrough said valve means to open position.

WILLIAM A. RAY.